US007863225B2

United States Patent
Chatterji et al.

(10) Patent No.: US 7,863,225 B2
(45) Date of Patent: *Jan. 4, 2011

(54) DEFOAMING METHODS AND COMPOSITIONS

(75) Inventors: Jiten Chatterji, Duncan, OK (US); Bobby J. King, Duncan, OK (US)

(73) Assignee: Halliburton Energy Services Inc., Duncan, OK (US)

( * ) Notice: Subject to any disclaimer, the term of this patent is extended or adjusted under 35 U.S.C. 154(b) by 65 days.

This patent is subject to a terminal disclaimer.

(21) Appl. No.: 12/392,041

(22) Filed: Feb. 24, 2009

(65) Prior Publication Data

US 2009/0156435 A1 Jun. 18, 2009

Related U.S. Application Data

(62) Division of application No. 11/683,248, filed on Mar. 7, 2007, now Pat. No. 7,517,836.

(51) Int. Cl.
*C09K 8/86* (2006.01)

(52) U.S. Cl. .................. 507/261; 507/219; 507/265; 507/266; 507/269; 166/285

(58) Field of Classification Search .................. None
See application file for complete search history.

(56) References Cited

U.S. PATENT DOCUMENTS

| | | | |
|---|---|---|---|
| 2,805,719 A | 9/1957 | Anderson | |
| 2,876,841 A | 3/1959 | Ryan | |
| 3,132,693 A | 5/1964 | Weisend | |
| 3,223,622 A | 12/1965 | Lummus et al. | |
| 4,326,968 A | 4/1982 | Blair, Jr. | |
| 4,326,983 A | 4/1982 | Blair, Jr. | |
| 4,515,635 A | 5/1985 | Rao et al. | |
| 4,555,269 A | 11/1985 | Rao et al. | |
| 4,818,288 A | 4/1989 | Aignesberger et al. | |
| 5,020,598 A * | 6/1991 | Cowan et al. | 166/293 |
| 5,045,565 A | 9/1991 | Gardner et al. | |
| 5,057,238 A * | 10/1991 | Broze et al. | 510/304 |
| 5,461,075 A | 10/1995 | O'Neill et al. | |
| 5,746,814 A | 5/1998 | Malhotra et al. | |
| 5,866,534 A | 2/1999 | Gryj et al. | |
| 6,063,738 A | 5/2000 | Chatterji et al. | |
| 6,156,808 A | 12/2000 | Chatterji et al. | |
| 6,227,294 B1 | 5/2001 | Chatterji et al. | |
| 6,234,251 B1 | 5/2001 | Chatterji et al. | |
| 6,261,341 B1 | 7/2001 | Cifuentes et al. | |
| 6,297,202 B1 | 10/2001 | Chatterji et al. | |
| 6,315,042 B1 | 11/2001 | Griffith et al. | |
| 6,417,142 B1 | 7/2002 | Chatterji et al. | |
| 6,524,384 B2 | 2/2003 | Griffith et al. | |
| 6,566,321 B1 * | 5/2003 | Thekkekandam et al. | 510/424 |
| 6,666,268 B2 | 12/2003 | Griffith et al. | |
| 6,668,929 B2 | 12/2003 | Griffith et al. | |
| 6,716,282 B2 | 4/2004 | Griffith et al. | |
| 6,875,801 B2 | 4/2005 | Shendy et al. | |
| 6,894,013 B2 * | 5/2005 | Clarke et al. | 510/221 |
| 6,902,002 B1 | 6/2005 | Chatterji et al. | |
| 7,022,755 B1 | 4/2006 | Chatterji et al. | |
| 7,150,322 B2 | 12/2006 | Szymanski et al. | |
| 7,183,325 B2 | 2/2007 | Dyllick-Brenzinger et al. | |
| 7,216,705 B2 | 5/2007 | Saini et al. | |
| 7,268,100 B2 | 9/2007 | Kippie et al. | |
| 7,308,938 B1 | 12/2007 | Chatterji et al. | |
| 2003/0187101 A1 | 10/2003 | Shendy et al. | |
| 2005/0092211 A1 | 5/2005 | Lewis et al. | |
| 2005/0271595 A1 | 12/2005 | Brown | |
| 2006/0116296 A1 | 6/2006 | Kippie et al. | |
| 2006/0185847 A1 | 8/2006 | Saini et al. | |
| 2006/0272550 A1 | 12/2006 | Szymanski et al. | |
| 2006/0272820 A1 | 12/2006 | Szymanski et al. | |
| 2007/0012222 A1 | 1/2007 | Szymanski et al. | |

OTHER PUBLICATIONS

Clariant "Safety data sheet in accordance with 2001/58/EC Appretan Defoamer 5084 liq" Apr. 7, 2006.
Clariant Textile Business—Tech Tex, 2007.
CFR-3[TM] Cement Friction Reducer, 2005 Halliburton, H01325 Oct. 2005.
D-Air 3000[TM] and D-Air 3000L[TM], 2006 Halliburton, H02518 Jul. 2006.
D-Air 1 Anti-Foam Agent, Zonal Isolation Technology, 1999 Halliburton, H01514.
D-Air 2 Anti-Foam Agent, Zonal Isolation Technology, 1999 Halliburton, H01515.
D-Air 3 Defoamer, Zonal Isolation Technology, 1998 Halliburton, H01326.
Diacel LWL Cement Retarder/Fluid-Loss Additive, Zonal Isolation Technology, 1999 Halliburton, H01482.
Dual Spacer[TM], 2006 Halliburton, H01518-A4 Sep. 2006.
Halad -9 Fluid-Loss Additive, Zonal Isolation Technology, 1999 Halliburton, H01497.
Halad -23 Fluid-Loss Additive, 2005 Halliburton, H02389 Dec. 2005.
Halad -344 Fluid-Loss Additive, 2006 Halliburton, H01331 May 2006.
Hi-Dense Weight Additives, Zonal Isolation Technology, 1998 Halliburton, H01334.
HR -12 Cement Retarder, 2007 Halliburton, found at http://www.halliburton.com/public/cem/contents/Data_Sheets/web/H/H01476.asp?print=yes.
Latex 2000 Cement Additive, 2006 Halliburton, H01336-A4 Aug. 2006.
NF-1 Additive Nonfoaming Agent, Zonal Isolation Technology, 1999 Halliburton, H01465.

(Continued)

*Primary Examiner*—John J Figueroa
(74) *Attorney, Agent, or Firm*—Craig W. Roddy; Tumey LLP

(57) ABSTRACT

Embodiments of the present invention are directed to defoaming methods and compositions for well treatment fluids. An exemplary embodiment of the present invention provides a method of defoaming a well treatment fluid, comprising combining a defoaming composition with the well treatment fluid, wherein the defoaming composition comprises an amide of a carboxylic acid, a polypropylene glycol, an ethoxylated and propoxylated fatty alcohol, an ethoxylated alcohol comprising from 3 carbons to 6 carbons, and a hydrophobic silica in an amount of up to about 3% by weight of the defoaming composition.

19 Claims, No Drawings

OTHER PUBLICATIONS

NF-4 Additive Defoamer, Zonal Isolation Technology, 1999 Halliburton, H01466.

NF-5 Additive Defoaming Agent, Zonal Isolation Technology, 1999 Halliburton, H01467.

NF-6[TM] Defoamer, 2006 Halliburton, H01337.

NF-7 Additive Defoaming Agent, Zonal Isolation Technology, 1999 Halliburton, H01468.

SSA-1 Strength-Stabilizing Agent, Zonal Isolation Technology, 1998 Halliburton, H01340.

Stabilizer 434B Latex Stabilizer, 2005 Halliburton, H01509 Oct. 2005.

Clariant GmbH, Exactly your chemistry-Surfactants for Industrial Applications, Feb. 2004.

Advanced Fillers & Pigments-Performance Silica, SUPERNAT D10, found at http://www.degussa-fp.com/fe/en/gesch/kiesels/default.htm?Product=5030, printed from Internet on Feb. 2007.

Aerosil Product Finder-AEOROSIL R202, found at http://www.aerosil.com/wps/portal/p9/kcxml/bcndEoFAGIDha-kCzLcROd1-jLRLtKvak5....,printed from Internet on Feb. 26, 2007.

USPTO Notice of Allowance from U.S. Appl. No. 11/683,214 dated Oct. 9, 2007.

USPTO Office Action from U.S. Appl. No. 11/683,248 dated Jul. 14, 2008.

USPTO Notice of Allowance and Fee(s) Due from U.S. Appl. No. 11/683,248 dated Feb. 9, 2009.

USPTO Office Action from U.S. Appl. No. 11/683,248 dated Dec. 3, 2008.

USPTO Notice of Allowability from U.S. Appl. No. 11/683,214 dated Sep. 27, 2007.

* cited by examiner

DEFOAMING METHODS AND COMPOSITIONS

CROSS-REFERENCE TO RELATED APPLICATIONS

This application is a divisional of U.S. patent application Ser. No. 11/683,248, entitled "Defoaming Methods and Compositions," filed on Mar. 27, 2007, the entire disclosure of which is incorporated herein by reference.

BACKGROUND

The present invention relates to defoaming methods and compositions and, more particularly, to methods and compositions for hindering the formation of foam or breaking foam in well treatment fluids.

Defoaming compositions have long been used in the oil and gas industry and other industries to hinder the formation of foam, hinder entrainment of a gas in a liquid, or break previously formed foam. For example, defoaming compositions are commonly utilized as components in liquids used in subterranean operation, such as well treatment fluids to hinder the formation of foam or the entrainment of a gas in the liquids during the preparation and/or pumping of the fluid. Also, defoaming compositions have traditionally been utilized for breaking previously foamed treatment fluids. For example, when a foamed well treatment fluid must be disposed of on the surface, a defoaming composition may be added to the fluid to destroy the foam, thus, facilitating disposal of the liquid components of the treating fluid.

Defoaming compositions and methods may be employed to avoid adverse consequences associated with inadvertent formation of foam or entrainment of gas in well treatment fluids, such as drilling fluids, stimulation fluids, cement compositions, and completion fluids. For example, if well treatment fluids are inadvertently foamed or air is entrained into the fluids while being agitated, mixed and/or pumped, an associated change in density of the well treatment fluid may interfere with the operation of pumps (e.g., positive displacement pumps) designed to move the well treatment fluid. In another example, foaming and entrained gas may impact the desired operation of the well treatment fluid by changing the characteristics (e.g., density or viscosity) of the well treatment fluid. For example, if a well cement composition is foamed or otherwise entrains air during pumping and/or mixing, the density of the resulting cement composition may be considerably lower than the desired or required density. This reduction in the density of the cement composition may prevent the cement composition from exerting a desired hydrostatic pressure on a formation, prevent the cement composition from having sufficient compressive strength, and so forth.

A variety of defoaming compositions have traditionally been utilized in the oil and gas industry. Examples of such defoaming compositions utilized in well treatment fluids include compositions of glycerol tristerate and one or more aliphatic hydrocarbons. Other defoaming compositions that have been utilized include propylene glycol and a mixture of propylene glycol with a copolymer of ethylene oxide and propylene oxide monomers. While these defoaming compositions may function adequately to prevent the formation of foam in well treatment fluids when they are prepared and pumped, they may not function adequately for defoaming previously foamed well treatment fluids, and particularly previously foamed well cement compositions. Still other defoaming compositions include mixtures of polypropylene glycol, particulate hydrophobic silica, and a liquid diluent. While these defoaming compositions may function adequately to prevent or reduce foaming after initial preparation, it is now recognized that the silica in these compositions settles within about 6 months, which may cause problems with consistency and pouring of such defoaming compositions from storage containers. This may effectively reduce the shelf life of these defoaming compositions to less than 9 months.

SUMMARY

The present invention relates to defoaming methods and compositions and, more particularly, to methods and compositions for hindering the formation of foam or breaking foam in well treatment fluids.

An exemplary embodiment of the present invention provides a method of defoaming a well treatment fluid, comprising combining a defoaming composition with the well treatment fluid, wherein the defoaming composition comprises an amide of a carboxylic acid, a polypropylene glycol, an ethoxylated and propoxylated fatty alcohol, an ethoxylated alcohol comprising from 3 carbons to 6 carbons, and a hydrophobic silica in an amount of up to about 3% by weight of the defoaming composition.

Another exemplary embodiment of the present invention provides a composition comprising a well treatment fluid and a defoaming composition. The defoaming composition comprises an amide of carboxylic acid, a polypropylene glycol, an ethoxylated and propoxylated fatty alcohol, an ethoxylated alcohol comprising from 3 carbons to 6 carbons, and a hydrophobic silica in an amount of up to about 3% by weight of the defoaming composition.

Another exemplary embodiment of the present invention provides a composition comprising a well treatment fluid and a defoaming composition. The defoaming composition comprises an amide of isononanoic acid, a polypropylene glycol, a $C_{12-15}$ fatty alcohol substituted with about 4 moles of ethylene oxide and about 4 moles of propylene oxide, n-butyl alcohol substituted with from about 3 moles to about 4 moles of ethylene oxide, and a mixture of hydrophobic precipitated silica and hydrophobic fumed silica in an amount of up to about 3.0% by weight of the defoaming composition.

DESCRIPTION OF SPECIFIC EMBODIMENTS

The present invention relates to defoaming methods and compositions and, more particularly, to methods and compositions for hindering the formation of foam or breaking foam in well treatment fluids. In general, a defoaming composition operates to lower interfacial tension in a liquid. By lowering the interfacial tension, the defoaming composition may enable gas to escape from the liquid. Accordingly, defoaming compositions of the present invention may be useful in well treatment fluids (e.g., drilling fluids, fracturing fluids, cement compositions and the like) to hinder foaming or air entrainment during agitating, mixing, or pumping such fluids. Additionally, exemplary embodiments may be useful in breaking or reducing foam and entrained air that is already present in a well treatment fluid.

Exemplary embodiments of the defoaming compositions of the present invention may comprise an amide of a carboxylic acid, a polypropylene glycol (PPG), an ethoxylated and propoxylated fatty alcohol, an ethoxylated alcohol containing from 3 carbons to 6 carbons, and a hydrophobic silica in an amount of up to about 3% by weight of the defoaming composition. In exemplary embodiments, the amide of carboxylic acid may be present in the defoaming composition in an amount in the range of from about 12% to about 18% by weight; the PPG may be present in the defoaming composition in an amount in the range of from about 15% to about 25% by weight; the ethoxylated and propoxylated fatty alcohol may be present in the defoaming composition in an amount in the range of from about 30% to about 37% by weight; the ethoxylated alcohol containing from 3 carbons to 6 carbons may be present in the defoaming composition in an amount in the range of from about 23% to about 33% by weight, and a hydrophobic silica in an amount of about 1% to about 3% by weight. For example, one exemplary embodiment comprises an amide of isononanoic acid in an amount of about 15% by weight, PPG 3000 in an amount of about 20% by weight, a $C_{12-15}$ fatty alcohol in an amount of about 35% by weight and substituted with about 4 moles of ethylene oxide and about 4 moles of propylene oxide, n-butyl alcohol in an amount of about 27.5% by weight and substituted with from about 3 moles to about 4 moles of ethylene oxide, a hydrophobic precipitated silica in an amount of about 2% by weight, and a hydrophobic fumed silica in an amount of about 0.5% by weight. An exemplary defoaming composition of the present invention is Antimussol® V 5084 defoaming agent, available from Clariant Corporation.

The amide of carboxylic acid used in exemplary embodiments of the defoaming compositions of the present invention may include amides of various carboxylic acids. In one exemplary embodiment, the amide of carboxylic acid may include an amide of a carboxylic acid having a carbon chain of from 8 carbons to 12 carbons. In another exemplary embodiment, the amide of carboxylic acid may include an amide of a carboxylic acid having a carbon chain of from 9 carbons to 11 carbons. For example, the amide of carboxylic acid may include an amide of nonanoic acid (e.g., isononanoic acid). Further, in exemplary embodiments, the amide of carboxylic acid may be present in the defoaming compositions in an amount in the range of from about 12% to about 18% by weight of the defoaming composition. In exemplary embodiments, the amide of carboxylic acid may be present in the defoaming compositions in an amount in the range of from about 14% to about 16% by weight of the defoaming composition. In one exemplary embodiment, the amide of carboxylic acid may comprise about 15% by weight of the defoaming composition.

As described above, exemplary embodiments of the defoaming compositions comprise PPG. In exemplary embodiments, the PPG may have a molecular weight in the range of from about 435 to about 4000. In exemplary embodiments, the PPG may have a molecular weight in the range of from about 3000 to about 4000. In one exemplary embodiment, the PPG may comprise PPG 3000. Additionally, in exemplary embodiments, the PPG may be present in the defoaming compositions in an amount in the range of from about 15% to about 25% by weight of the defoaming composition. In exemplary embodiments, the PPG may be present in the defoaming compositions in an amount in the range of from about 18% to about 22% by weight of the defoaming composition. In one exemplary embodiment, the PPG may comprise about 20% by weight of the defoaming composition.

The ethoxylated and propoxylated fatty alcohol used in exemplary embodiments of the defoaming compositions of the present invention may include various ethoxylated and propoxylated fatty alcohols. Those of ordinary skill in the art will appreciate that fatty alcohols generally include aliphatic alcohols derived from natural fats and oils. In one exemplary embodiment, the ethoxylated and propoxylated fatty alcohol may include ethoxylated and propoxylated $C_{12-15}$ fatty alcohols (e.g., a mixture of fatty alcohols containing 12 carbons to 15 carbons in various proportions), such as lauryl alcohol and/or 1-tetradecanol. In exemplary embodiments, the ethoxylated and propoxylated fatty alcohol may be substituted with about 3 moles to about 6 moles (e.g., 4 moles) of ethylene oxide per mole of the fatty alcohol and about 3 moles to about 6 moles (e.g., 4 moles) of propylene oxide per mole of the fatty alcohol. In certain exemplary embodiments, the substitution of the ethylene oxide is followed by the substitution of the propylene oxide to form an ethylene oxide-propylene oxide block copolymer. Further, in exemplary embodiments, the ethoxylated and propoxylated fatty alcohol may be present in the defoaming compositions in an amount in the range of from about 30% to about 37% by weight of the defoaming composition. In exemplary embodiments, the ethoxylated and propoxylated fatty alcohol may be present in the defoaming compositions in an amount in the range of from about 34% to about 36% by weight of the defoaming composition. In one exemplary embodiment, the ethoxylated and propoxylated fatty alcohol may comprise about 35% by weight of the defoaming composition.

Further, exemplary embodiments of the defoaming compositions comprise an ethoxylated alcohol having in the range of from 3 carbons to 6 carbons. Examples of suitable ethoxylated alcohols containing from 3 carbons to 6 carbons may include a particular alcohol (e.g., ethyl, propyl or butyl alcohol) or a combination of various alcohols (e.g., a mixture of propyl and butyl alcohol) that contain from 3 carbons to 6 carbons and have been ethoxylated. In one exemplary embodiment, the ethoxylated alcohol containing from 3 carbons to 6 carbons may include an ethoxylated propyl alcohol, butyl alcohol, pentyl alcohol, hexyl alcohol, or a combination thereof. In one exemplary embodiment, the ethoxylated alcohol comprises n-butyl alcohol. In exemplary embodiments, the ethoxylated alcohol containing from 3 carbons to 6 carbons may be substituted with about 3 moles to about 6 moles (e.g., 4 or 5 moles) of ethylene oxide per mole of the ethoxylated alcohol. Additionally, in exemplary embodiments, the ethoxylated alcohol containing from 3 carbons to 6 carbons may be present in the defoaming compositions in an amount in the range of from about 23% to about 33% by weight of the defoaming composition. In exemplary embodiments, the ethoxylated alcohol containing from 3 carbons to 6 carbons may be present in the defoaming compositions in an amount in the range of from about 25% to about 31% by weight of the defoaming composition. In one exemplary embodiment, the ethoxylated alcohol with 3 carbons to 6 carbons may comprise about 27.5% by weight of the defoaming composition.

As set forth above, exemplary embodiments of the defoaming compositions include hydrophobic silica. The hydrophobic silica may be produced by hydrophobizing a silica in any of various procedures, such as spraying it with a substantially uniform coating of silicone oil followed by heating. In exemplary embodiments the hydrophobic silica may include hydrophobic amorphous silica. For example, the hydrophobic amorphous silica may include a hydrophobic precipitated silica, a hydrophobic fumed silica, or a combination thereof. The hydrophobic precipitated silica may include Sipernat® D10, which is a product of the Degussa Company having a place of business in Chester, Pa. The hydrophobic fumed silica may include Aerosil® R202, which is also a product of the Degussa Company having a place of business in Chester, Pa. Additionally, in exemplary embodiments, the hydrophobic silica (e.g., hydrophobic fumed silica, hydrophobic precipitated silica, or a combination thereof) may be present in the defoaming compositions in an amount in the range of from about 1% to about 3% by weight of the defoaming composition. In one exemplary embodiment, the hydrophobic silica may be present in the defoaming composition in an amount of about 2.5% by weight of the defoaming composition. More specifically, the defoaming composition may include a hydrophobic precipitated silica in the amount of about 2% by weight of the defoaming composition and hydrophobic fumed silica in the amount of about 0.5% by weight of the defoaming composition. It should be noted that the amount and type of hydrophobic silica utilized in accordance with present embodiments may avoid certain issues typically encountered with such particulate matter being included in defoaming compositions. For example, exemplary embodiments may avoid issues relating to silica settling out of the defoaming composition in relatively short periods of time, problems relating to pouring the defoaming composition from a container, issues relating to a relatively limited shelf life of the defoaming composition, and so forth. No settling was observed in defoaming compositions in accordance with the present invention for a period in excess of one year. As such, exemplary defoaming compositions may have a shelf life of greater than about one year, for example.

Exemplary methods of the present invention may be directed to defoaming a well treatment fluid, For example, a method of defoaming a liquid may include hindering the formation of foam or entrainment of gas in a well treatment fluid during preparation or pumping of the well treatment fluid. In another example, a method of defoaming a well treatment fluid may include breaking a foamed well treatment fluid. These defoaming methods may be initiated by combining a defoaming composition with the well treatment fluid, wherein the defoaming composition includes an amide of a carboxylic acid, a polypropylene glycol, an ethoxylated and propoxylated fatty alcohol, an ethoxylated alcohol containing from 3 carbons to 6 carbons and a hydrophobic silica in an amount of up to about 3% by weight of the defoaming composition. To resist the formation of foam or entrainment of gas in a well treatment fluid, the defoaming composition of the present invention may be combined with the well treatment fluid in an amount in the range of from about 0.01% to about 2% by weight of the well treatment fluid, for example. To break a foamed well treatment fluid, the defoaming composition of the present invention may be combined with the well treatment fluid in an amount in the range of from about 0.01% to about 2% by weight of the well treatment fluid, for example. The well treatment fluid may include any well treatment fluid in which it may be desirable to break or hinder foaming or air entrainment. Examples of suitable well treatment fluids include cement compositions, stimulation fluids, drilling fluids, completion fluids, and the like.

Exemplary embodiments of the present invention may include combining a defoaming composition with a well treatment fluid, wherein the defoaming composition comprises an amide of a carboxylic acid, a polypropylene glycol, an ethoxylated and propoxylated fatty alcohol, an ethoxylated alcohol containing from 3 carbons to 6 carbons, and a hydrophobic silica in an amount of up to about 3% by weight of the defoaming composition. For example, one exemplary embodiment includes combining the defoaming composition with the well treatment fluid during preparation of the well treatment fluid. The well treatment fluid containing the defoaming composition may then be introduced into the subterranean formation. For example, the treatment fluid may be introduced into an annulus between a pipe string and a subterranean formation, such as in a primarily cementing operation. In cementing embodiments, the treatment fluid may be allowed to set in the annulus to gain compressive strength. Alternatively, the well treatment fluid may comprise a foamed well treatment fluid that has already been used in a subterranean treatment. The defoaming composition may be combined with the foamed well treatment fluid, for example, to break the foamed well treatment fluid and facilitate its disposal.

One embodiment of the present invention includes combining a defoaming composition with a cement composition. As previously mentioned, the defoaming composition may be combined with the cement composition during the preparation of the cement composition or to break a previously foamed cement composition. After combination with the defoaming composition, the cement composition generally may comprise cement, water, and the defoaming composition. The cement composition further may comprise one or more optional additives. Those of ordinary skill in the art will appreciate that the exemplary cement compositions generally should have a density suitable for a particular application and the defoaming composition may facilitate maintaining the density near the desired value. Additionally, exemplary cement compositions may comprise other density-varying additives, such as microspheres, elastic beads, or other density-reducing or density-increasing additives known in the art. Those of ordinary skill in the art, with the benefit of this disclosure, will recognize the appropriate density for a particular application.

The water used in exemplary embodiments of the cement compositions of the present invention may be fresh water or saltwater (e.g., water containing one or more salts dissolved therein, seawater, brines, or saturated saltwater). In general, the water may be present in an amount sufficient to form a pumpable slurry. In exemplary embodiments, the water may be present in the cement compositions in an amount in the range of from about 33% to about 200% by weight of the cement ("bwoc"). In exemplary embodiments, the water may be present in an amount in the range of from about 35% to about 70% bwoc.

Exemplary embodiments of the cement compositions of the present invention comprise a cement. Any of a variety of cements suitable for use in subterranean cementing operations may be used in accordance with exemplary embodiments of the present invention. Suitable examples include hydraulic cements that comprise calcium, aluminum, silicon, oxygen, and/or sulfur, which set and harden by reaction with water. Such hydraulic cements, include, but are not limited to, Portland cements, pozzolana cements, gypsum cements, high alumina cements, slag cements, and silica cements, and combinations thereof. In certain exemplary embodiments, the hydraulic cement may comprise a Portland cement. In some exemplary embodiments, the Portland cements that are suited for use in exemplary embodiments of the present invention are classified as Class A, C, H, and G cements according to American Petroleum Institute, *API Specification for Materials and Testing for Well Cements*, API Specification 10, Fifth Ed., Jul. 1, 1990.

To facilitate a better understanding of the present technique, the following examples of some specific embodiments are given. In no way should the following examples be read to limit, or to define, the scope of the invention.

EXAMPLE 1

An exemplary defoaming composition was prepared (composition A), which comprised an amide of isononanoic acid in an amount of about 15% by weight, PPG 3000 in an amount of about 20% by weight, a $C_{12-15}$ fatty alcohol in an amount of about 35% by weight and substituted with 3 moles of ethylene oxide and 3 moles of propylene oxide, a n-butyl alcohol in an amount of about 27.5% by weight and substituted with 3 moles to 4 moles of ethylene oxide, a hydrophobic precipitated silica in an amount of about 2% by weight, and hydrophobic fumed silica in an amount of about 0.5% by weight. Composition A was observed to have a pour point of 0° F. Two prior art compositions (D-AIR™ 3000L and D-AIR™ 4000L antifoaming agents, available from Halliburton Energy Services, Inc.) were also provided. D-AIR™ 3000L antifoaming agent is an example of a defoaming composition that comprises polypropylene glycol, particulate hydrophobic silica, and an aliphatic hydrocarbon, and D-AIR™ 4000L antifoaming agent is an example of a defoaming composition that comprises glycerol tristerate and one or more aliphatic hydrocarbons. These three defoaming compositions were added to various test cement compositions to determine relative defoaming efficiencies for each of the three defoaming compositions.

The test cement composition samples were prepared from five different cement slurries containing various conventional additives, i.e., a set of five cement compositions without a defoaming composition additive, a set of five cement composition samples containing a defoaming composition (composition A) of the present invention, a set of five cement composition samples containing a first prior art defoaming composition (D-AIR™ 3000L antifoaming additive), and a set of five cement composition samples containing a second prior art defoaming composition (D-AIR™ 4000L antifoaming additive). The components and quantities utilized in forming the various sets of five cement composition samples without the defoaming composition additives are set forth in Table I below.

TABLE II

DEFOAMER EFFICIENCY
Slurry Weight (ppg)
Measured Density Atmospheric Mud Balance

| Slurry | Designed Density | No Defoamer | D-Air 300L | D-Air 4000L | Composition A |
|---|---|---|---|---|---|
| 1 | 19.2 | 17.3 | 18.75 | 18.7 | 18.7 |
| 2 | 16.8 | 13.2 | 16.7 | 16.65 | 16.7 |
| 3 | 16.4 | 12.8 | 16.25 | 16.2 | 16.3 |
| 4 | 14.4 | 13.4 | 14.35 | 14.3 | 14.35 |
| 5 | 15.6 | 14.9 | 15.6 | 15.6 | 15.6 |

From Table II, it can be seen that the defoaming efficiencies of exemplary embodiments of the defoaming composition of the present invention substantially equal the defoaming efficiencies of the prior art defoaming compositions.

EXAMPLE 2

A slurry with a slurry weight of 16.12 pounds per gallon (ppg) was prepared and foamed for use in determining the relative effects on foam breaking efficiency of using an exemplary defoaming composition of the present invention versus using prior art defoaming compositions. The slurry was prepared with Portland class H cement, 1% foaming surfactant by volume of water, and 42% water bwoc. It should be noted that the foaming surfactant used to prepare the slurry was ZONESEAL™ 2000 foaming additive which is commercially available from Halliburton Energy Services, Inc. Once prepared, the slurry was foamed from 16.12 ppg to 10 ppg and

TABLE I

TEST WELL CEMENT COMPOSITIONS

| Test Cement Composition Number | Premium Cement | Water, % bwoc | Crystalline Silica[1], % bwoc | Sodium Chloride, % bwoc | Weighting Agent[2], % bwoc | Set Retarder[3], % bwoc | Fluid Loss Control Additive, % bwoc | Dispersing agent[4], % bwoc |
|---|---|---|---|---|---|---|---|---|
| 1 | Yes | 46 | 35 | 37.2 | 49 | 1 | 0.6[5] | — |
| 2 | Yes | 38 | — | 37.2 | — | 1 | — | — |
| 3 | Yes | 43 | — | 35 | — | 1 | 0.05[6] | 0.3 |
| 4 | Yes | 61 | — | — | — | — | 1[7] | — |
| 5 | Yes | 46 | — | — | — | — | 0.8[5] | — |

[1]SSA-1 ™ cement additive, available from Halliburton Energy Services, Inc.
[2]High-Dense ® cement weighting additive, available from Halliburton Energy Services, Inc.
[3]HR ®-12 cement retarder, available from Halliburton Energy Services, Inc.
[4]CFR-3 ™ cement dispersant, available from Halliburton Energy Services, Inc.
[5]Halad ®-9 fluid loss additive, available from Halliburton Energy Services, Inc.
[6]DIACEL LWL ™ additive, available from Halliburton Energy Services, Inc.
[7]Gasban ™ fluid loss additive, available from Halliburton Energy Services, Inc.

The theoretical design density of each of the test cement composition samples was determined as was the density of each test cement composition sample which did not include a defoaming composition additive. The density of each test cement composition sample including a prior art defoamer (D-AIR™ 3000L and D-AIR™ 4000L antifoaming agents) and the density of each test cement composition sample including the exemplary defoaming composition of the present invention (composition A) was determined. The results of these tests are given in Table II below. The prior art defoaming composition additive and the defoaming composition of the present invention were combined with the test cement composition samples in amounts of 0.25% bwoc therein.

separate samples of the foamed slurry were combined with the prior art defoaming compositions and the defoaming composition of the present invention, respectively. Specifically, a single one of the D-AIR™ 3000L antifoaming agent, D-AIR™ 4000L antifoaming agent, and composition A defoaming composition was added into each of the foamed slurry samples in a ratio of 3 grams of defoaming composition per 300 cubic centimeters of foam slurry. The resultant composition was hand mixed for 1 minute. The slurry sample was weighed after mixing with the two prior art defoaming compositions and the exemplary defoaming composition of the present invention.

The results of this procedure are set forth in Table III below. Specifically, Table III includes the slurry weight of a first slurry sample after mixing with D-AIR™ 3000L antifoaming agent, the slurry weight of a second slurry sample after mixing with D-AIR™ 4000L antifoaming agent, and the slurry weight of a third slurry sample after mixing with composition A.

TABLE III

EFFECT OF DEFOAMER ON FOAM BREAKING EFFICIENCY

| Defoamer | D-Air ™ 3000L Antifoaming Agent | D-Air ™ 4000L Antifoaming Agent | Composition A |
|---|---|---|---|
| Density | 11.6 ppg | 15.30 ppg | 15.23 ppg |

EXAMPLE 3

A latex slurry with a slurry weight of 16.0 ppg was prepared for use in determining the relative effects on a latex slurry of using an exemplary defoaming composition of the present invention versus using prior art defoaming compositions. The latex slurry was prepared with Portland class H cement, 2.0 gallons of a styrene-butadiene latex per 94 pound sack of the cement, 0.8% lignin-based retarder bwoc, 18% NaCl by weight of water, 0.075 gallons of a foaming surfactant per 94 pound sack of the cement, and 0.3 gallons of a latex stabilizer per 94 sack of the cement. It should be noted that the styrene-butadiene latex used to prepare the slurry was LATEX™ 2000 cement additive, available from Halliburton Energy Services. The lignin-based retarder used to prepare the slurry was HR®-601 cement retarder, available from Halliburton Energy Services. The foaming surfactant used to prepare the slurry was SULFOCHEM® 247H alkyl ether sulfate, available from Chemron, Paso Robles, Calif. Additionally, the latex stabilizer used to prepare the slurry was Stabilizer 434D, available from Halliburton Energy Services, Inc.

Separate samples of the latex slurry were combined with the prior art defoaming compositions and the exemplary defoaming composition of the present invention, respectively. The defoaming compositions were respectively added in an amount of 0.1 gallons per 94 pound sack of the cement. The latex slurry sample weights after mixing with the two prior art defoaming compositions and the defoaming composition of the present invention are set forth in Table IV below. Specifically, Table IV includes the slurry weight of a first latex slurry sample after mixing with D-AIR™ 3000L antifoaming agent, the slurry weight of a second latex slurry sample after mixing with D-AIR™ 4000L antifoaming agent, and the slurry weight of a third latex slurry sample after mixing with composition A.

TABLE IV

EFFECT OF DEFOAMER ON LATEX SLURRY

| Defoamer | D-Air ™ 3000L Antifoaming Agent | D-Air ™ 4000L Antifoaming Agent | Composition A |
|---|---|---|---|
| Density | 14.45 ppg | 13.9 ppg | 15.10 ppg |

EXAMPLE 4

The following series of experiments were performed to determine the effects of the defoaming composition of the present invention when combined with fluid loss additives. A test cement composition was prepared that comprised class H cement, water in an amount of 5.3 gallons per sack of the cement, and 0.03 gallons of composition A per pound of cement. The cement composition had a density of 15.56 ppg. Additionally, three different fluid loss control additives were added in the amounts given in Table V below.

After preparation, each sample cement composition was poured into a pre-heated cell with a 325-mesh screen, and a fluid loss test was performed for 30 minutes at 1,000 psi at 125° F. The fluid loss tests were performed in accordance with API RP 10B, Recommended Practices for Testing Well Cements. Additionally, the rheological properties of the sample cement compositions were also determined using a Fann® Model 35 viscometer at the temperature listed in the table below, in accordance with the above-mentioned APP RP 10B. The results of these tests are given in Table V below.

TABLE V

EFFECT OF DEFOAMER WITH FLUID LOSS ADDITIVES

| Fluid Loss Additive | Temp. (° F.) | Rheology Test: Viscometer Readings | | | | | | Fluid Loss at 125° F. (cc/30 minutes) |
| | | 300 RPM | 200 RPM | 100 RPM | 6 RPM | 3 RPM | 600 RPM | |
|---|---|---|---|---|---|---|---|---|
| Halad ® 9 | 80 | 123 | 93 | 56 | 12 | 11 | 216 | — |
| 1.0% bwoc | 125 | 112 | 89 | 53 | 13 | 12 | 188 | 45 |
| Halad ® 23 | 80 | 254 | 194 | 116 | 19 | 15 | 300+ | — |
| 1.0% bwoc | 125 | 195 | 146 | 87 | 16 | 13 | 300+ | 36 |
| Halad ® 344 | 80 | 94 | 68 | 38 | 16 | 13 | 164 | — |
| 0.6% bwoc | 125 | 96 | 76 | 47 | 12 | 10 | 164 | 35 |

It is readily observable from Table V that an exemplary embodiment of the defoaming compositions of the present invention does not materially affect rheology.

EXAMPLE 5

Compressive strength tests were performed to compare the performance of sample cement compositions that comprised an exemplary embodiment of the defoaming compositions of the present invention (composition A) with a prior art defoaming composition (D-AIR™ 3000L antifoaming agent). Accordingly, separate sample cement compositions were prepared that comprised Portland class H cement, water in an amount of 5.3 gallons per 94 pound sack of the cement, and 0.03 gallons of one of the defoaming composition A or D-AIR™ 3000L antifoaming agent per 94 pound sack of the cement. Furthermore, three different fluid loss control additives were added in the amounts given in Table VI below to both sample cement compositions.

After preparation, the sample cement compositions were subjected to 48-hour compressive strength tests at the temperature listed in Table VI below, in accordance with API RP10B, Recommended Practices for Testing Well Cements. The results of these tests are set forth in Table VI below.

TABLE VI

EVALUATION OF DEFOAMER ON COMPRESSIVE STRENGTH DEVELOPMENT
Portland Class H Cement, 5.3 gal/sk of Water

| Fluid Loss Additive | Defoamer (0.03 gal/sk) | Temp. (° F.) | 24 Hr. Comp. Strength (psi) | 48 Hr. Comp. Strength (psi) |
|---|---|---|---|---|
| Halad ® 344 0.6% bwoc | Composition A | 160 | 2466 | 2695 |
| Halad ® 23 1% bwoc | Composition A | 160 | Not set | 2310 |
| Halad ® 9 1% bwoc | Composition A | 160 | 1815 | 2405 |
| Halad ® 344 0.6% bwoc | D-Air ™ 3000L | 160 | 2686 | 2883 |
| Halad ® 23 1% bwoc | D-Air ™ 3000L | 160 | Not set | 2352 |
| Halad ® 9 1% bwoc | D-Air ™ 3000L | 160 | 1725 | 2346 |

EXAMPLE 6

Thickening time tests were performed to compare the performance of sample cement compositions that comprised exemplary embodiments of the defoaming compositions of the present invention (composition A) with samples without a defoamer. Accordingly, sample cement compositions were prepared that comprised Portland Class H cement, 2.0% $CaCl_2$ bwoc, and 5.3 gallons of water per 94 pound sack of the cement. After preparation, the sample cement compositions were subjected to thickening time tests at 80° F., in accordance with API RP10B, Recommended Practices for Testing Well Cements. The results compared with samples utilizing no defoamer are set forth in Table VII below.

TABLE VII

THICKENING TIME RESPONSE

| Time (Hr:min) | Composition A Viscosity (Bc) | No Defoamer Viscosity (Bc) |
|---|---|---|
| Initial | 5 | 8 |
| 1:00 | 9 | 11 |
| 2:00 | 25 | 28 |
| 2:30 | 37 | 45 |
| 3:13 | — | 70 |
| 3:35 | 70 | — |

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee.

What is claimed is:

1. A composition comprising:
   a well treatment fluid; and
   a defoaming composition comprising an amide of carboxylic acid, a polypropylene glycol, an ethoxylated and propoxylated fatty alcohol, an ethoxylated alcohol comprising from 3 carbons to carbons that is ethoxylated with from about 3 moles to about 6 moles of ethylene oxide per mole of the alcohol, and a hydrophobic silica in an amount of up to about 3% by weight of the defoaming composition,
   wherein the fatty alcohol is ethoxylated with from about 4 moles to about 6 moles of ethylene oxide per mole of the fatty alcohol,
   wherein the fatty alcohol is propoxylated with from about 4 moles to about 6 moles of propylene oxide per mole of the fatty alcohol, and
   wherein the ethoxylated and propoxylated fatty alcohol is present in the defoaming composition in the range of from about 30% to about 37% by weight of the defoaming composition, wherein the defoaming composition is present in the composition in an amount of about 0.01% to about 2% by weight of the well treatment fluid.

2. The composition of claim 1, wherein the well treatment fluid comprises at least one fluid selected from the group consisting of drilling fluids, stimulation fluids, completion fluids, and cement compositions.

3. The composition of claim 1, wherein the amide of the carboxylic acid comprises a carbon chain in the range of from 8 carbons to 12 carbons.

4. The composition of claim 1, wherein the amide of the carboxylic acid comprises nonanoic acid.

5. The composition of claim 1, wherein the amide of carboxylic acid comprises an amide of isononanoic acid and wherein the amide of isononanoic acid is present in the defoaming composition in an amount in the range of from about 12% to about 18% by weight of the defoaming composition.

6. The composition of claim 1, wherein the polypropylene glycol has a molecular weight in the range from about 435 to about 4000, and wherein the polypropylene glycol is present in the defoaming composition in an amount in the range of from about 15% to about 25% by weight of the defoaming composition.

7. The composition of claim 1, wherein the ethoxylated and propoxylated fatty alcohol comprises an ethoxylated and propoxylated $C_{12-15}$ fatty alcohol.

8. The composition of claim 1, wherein the ethoxylated and propoxylated fatty alcohol comprises an ethylene oxide-propylene oxide block copolymer.

9. The composition of claim 1, wherein the ethoxylated alcohol comprises ethoxylated n-butyl alcohol.

10. The composition of claim 1, wherein the ethoxylated alcohol is present in the defoaming composition in an amount in the range of from about 23% to about 33% by weight of the defoaming composition.

11. The composition of claim 1, wherein hydrophobic silica comprises hydrophobic amorphous silica.

12. A composition comprising:

cement;

water; and a defoaming composition comprising an amide of carboxylic acid, a polypropylene glycol, an ethoxylated and propoxylated fatty alcohol, an ethoxylated alcohol comprising from 3 carbons to carbons that is ethoxylated with from about 3 moles to about 6 moles of ethylene oxide per mole of alcohol, and a hydrophobic silica in an amount of up to about 3% by weight of the defoaming composition.

13. The composition of claim 12, wherein the cement comprises at least one cement selected from the group consisting of Portland cement, pozzolana cement, gypsum cement, high alumina cement, slag cement, silica cement, and combinations thereof.

14. The composition of claim 12:

wherein the amide of the carboxylic acid comprises a carbon chain in the range of from 8 carbons to 12 carbons;

wherein the ethoxylated and propoxylated fatty alcohol comprises an ethoxylated and propoxylated lauryl alcohol.

15. The composition of claim 12:

wherein the amide of the carboxylic acid comprises nonanoic acid;

wherein the ethoxylated and propoxylated fatty alcohol comprises an ethoxylated and propoxylated $C_{12-15}$ fatty alcohol, wherein the fatty alcohol is ethoxylated with from about 4 moles to about 6 moles of ethylene oxide per mole of the fatty alcohol, and wherein the fatty alcohol is propoxylated with from about 4 moles to about 6 moles of propylene oxide per mole of the fatty alcohol;

wherein the ethoxylated alcohol comprising from 3 carbons to 6 carbons comprises an ethylene oxide-propylene oxide block copolymer; and wherein the hydrophobic silica comprises hydrophobic amorphous silica.

16. The composition of claim 12:

wherein the amide of the carboxylic acid is present in the defoaming composition in an amount of about 12% to about 18% by weight of the defoaming composition;

wherein the polypropylene glycol is present in the defoaming composition in an amount of about 15% to about 25% by weight of the defoaming composition;

wherein the fatty alcohol is present in the defoaming composition in an amount of about 30% to about 37% by weight of the defoaming composition; and wherein the ethoxylated alcohol comprising from 3 carbons to 6 carbons is present in the defoaming composition in an amount of about 23% to about 33% by weight of the defoaming composition.

17. A composition comprising:

water; and a defoaming composition comprising:

an amide of a nonanioc acid having a carbon chain in the range of from 8 carbons to 12 carbons, a polypropylene glycol, a $C_{12}$-$C_{15}$ fatty alcohol ethoxylated with from about 4 moles to about 6 moles of ethylene oxide per mole of the fatty alcohol and propoxylated with from about 4 moles to about 6 moles of propylene oxide per mole of the fatty alcohol, wherein the $C_{12}$-$C_{15}$ fatty alcohol is present in the defoaming composition in an amount of about 30% to about 37% by weight of the defoaming composition, an alcohol comprising from 3 carbons to 6 carbons and ethoxylated with from about 3 moles to about 6 moles of ethylene oxide per mole of the alcohol, and a hydrophobic silica in an amount of up to about 3% by weight of the defoaming composition, and wherein the defoaming composition is present in the composition in an amount of about 0.01% to about 2% by weight of the composition.

18. The composition of claim 17:

wherein the amide of the nonanionic acid is present in the defoaming composition in an amount of about 12% to about 18% by weight of the defoaming composition;

wherein the polypropylene glycol is present in the defoaming composition in an amount of about 15% to about 25% by weight of the defoaming composition; and wherein the alcohol comprising from 3 carbons to 6 carbons is present in the defoaming composition in an amount of about 23% to about 33% by weight of the defoaming composition.

19. The composition of claim 17, wherein the composition comprises a cement.

* * * * *